Dec. 24, 1968   W. L. HARTLEY   3,417,946
T-TAIL CONSTRUCTION FOR AIRCRAFT
Filed Dec. 29, 1967   4 Sheets-Sheet 1

INVENTOR.
WILLIAM L. HARTLEY
BY
Agent

Dec. 24, 1968   W. L. HARTLEY   3,417,946
T-TAIL CONSTRUCTION FOR AIRCRAFT
Filed Dec. 29, 1967   4 Sheets-Sheet 2

INVENTOR.
WILLIAM L. HARTLEY
BY
Agent

Dec. 24, 1968  W. L. HARTLEY  3,417,946
T-TAIL CONSTRUCTION FOR AIRCRAFT
Filed Dec. 29, 1967  4 Sheets-Sheet 3

INVENTOR.
WILLIAM L. HARTLEY
BY
George C. Sullivan
Agent

Dec. 24, 1968  W. L. HARTLEY  3,417,946
T-TAIL CONSTRUCTION FOR AIRCRAFT
Filed Dec. 29, 1967  4 Sheets-Sheet 4

INVENTOR.
WILLIAM L. HARTLEY
BY
*George C. Sullivan*
Agent

United States Patent Office 3,417,946
Patented Dec. 24, 1968

3,417,946
T-TAIL CONSTRUCTION FOR AIRCRAFT
William L. Hartley, Marietta, Ga., assignor to Lockheed Aircraft Corporation, Burbank, Calif.
Filed Dec. 29, 1967, Ser. No. 694,556
8 Claims. (Cl. 244—87)

ABSTRACT OF THE DISCLOSURE

A T tail construction for aircraft is provided which is predicated on two basic concepts—(1) the extension of an uninterrupted horizontal stabilizer box beam across the vertical stabilizer (pivot) intersection and the capability of this horizontal stabilizer of assuming various pitch trim angles, and (2) the hinged aerodynamic fairing which has its forward portion mounted to and rotating with the horizontal stabilizer box beam and the aft portion rigidly attached to the vertical stabilizer box beam. The horizontal stabilizer box beam is constructed of ribs joining front and rear beams skinned with milled integral riser skin planks and/or conventional skin-stringer type skins.

Figure 1:
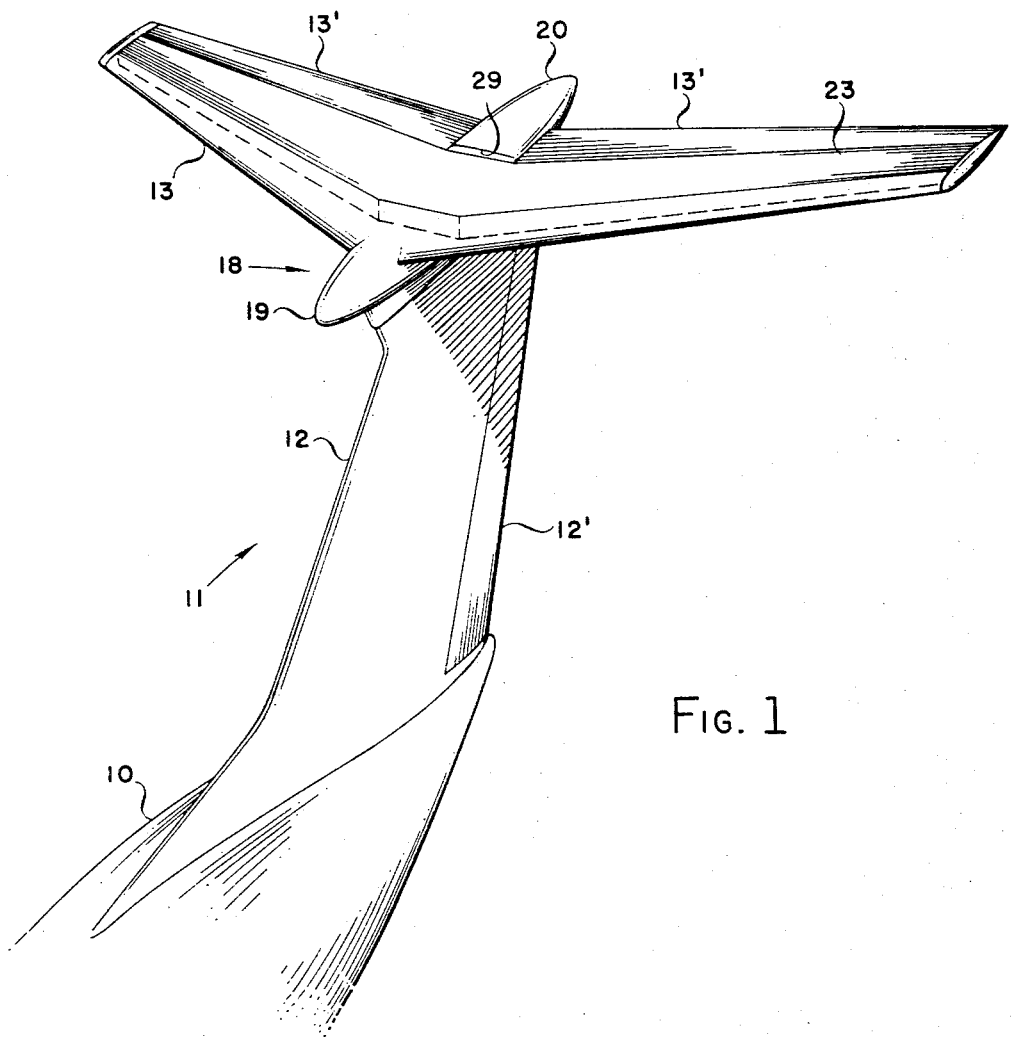

This invention relates generally to aircraft construction and more particularly to the construction of the tail section or empennage of T tail type aircraft where the horizontal control surface or stabilizer is mounted for rotation in its various pitch trim angles adjacent the top or outer end of the vertical control surface or stabilizer to be disposed in the free and virtually unobstructed airstream and is especially characterized by the aerodynamic fairing employed between the stabilizers in the pivot area.

T tails have been resorted to in some aircraft designs where engines are mounted at the aft end of the fuselage in order to locate the horizontal stabilizers clear of the exhaust or jet discharge. T tails have also proven to be highly desirable in cargo and/or transport type aircraft permitting better access for on and off loading through aft end doors. Allowances in such applications have had to be made to permit angular deflection of the horizontal stabilizer and particular efforts are required to establish and maintain aerodynamically clean surfaces at the junction of the horizontal and vertical stabilizers.

Heretofore, this has been accomplished in one of two ways. Either the entire horizontal stabilizer is pivoted to the top of the vertical stabilizer with an apron or skirt serving as a continuous overlapping skin or fairing at and along the hinge area; or else the horizontal stabilizer intersects the vertical stabilizer near the top thereof passing through a slot in the vertical stabilizer which allows it to rotate in its several pitch trim angles with the inner or root ends of the horizontal stabilizer contoured to substantially abut the associated sides of the vertical stabilizer and aerodynamic fairing enclosing the upper end thereof. In either case, rigid structural beams or spars are required that extend from tip to tip of the horizontal stabilizer in order to assure the proper movement and provide the necessary structural integrity under the normal or expected flight loads.

As aircraft become larger, the structural weight penalty of this conventional construction becomes prohibitive. Not only are longer horizontal stabilizers requiring larger and heavier spars involved, but also larger actuators become necessary and the root of the vertical stabilizer where the entire upswung empennage is mounted and supported on the fuselage must be reinforced. These accumulations are not linear, but logarithmic to a point where T tails of conventional construction become impossible in very large cargo aircraft.

The present invention is, therefore, directed primarily to improvements in T tail construction where some of the structural weight penalty heretofore associated with the larger present day aircraft is eliminated. This is largely effected by optimizing the aerodynamic fairing for the pivot area between the horizontal and vertical stabilizers so that the size of the movable horizontal stabilizer is reduced to a minimum and the size of the stationary supporting vertical stabilizer may be thereby relatively increased. Thus, the proportional changes in size of the fixed and movable members or structures provide an appreciable weight savings. Moreover, the present construction lends itself to further gains in weight-to-strength ratios by permitting the use of torque box beams in lieu of the heretofore necessary heavier spars.

In addition to the foregoing, the T tail construction herein proposed offers several other advantages over prior art constructions. For example, in cruise, pitch trim angles, the aerodynamic fairing herein permits a low drag count fully comparable to the smaller T tail aircraft of today. At the same time, this fairing induces drag in pitch trim angles associated with landing. Such induced drag conditions are also available and may be used to advantage in aerial delivery operations which are often required in military versions of these cargo and transport aircraft.

More specifically, the construction herein contemplated comprises in essence an aerodynamic fairing or "bullet," as it is customarily called, formed in two halves with adjacent ends that telescope and pivotally interconnect. The upper portion of this fairing adjacent its telescoping ends is contoured or developed radially about the pivot so as to overlie the intersection of the vertical and horizontal stabilizer, while the lower portion is developed as a spherical section mated to a conical section. The forward and aft halves of the fairing are thus made to rotate, maintaining a constant, uniform spacing therebetween permitting the additional advantage of facilitating sealing.

In view of the above design and arrangement, the forward half or forebody of the fairing constitutes, in effect, an integral part of the horizontal stabilizer with which it rotates as a unit in the various pitch trim angles. The aft half or afterbody of the fairing, on the other hand, constitutes, in effect, an integral extension on the vertical stabilizer. Projecting, mating elements carried by the forebody and the adjacent portion of the vertical stabilizer prevent a gap therebetween and provide for sealing where desired.

Figure 2:
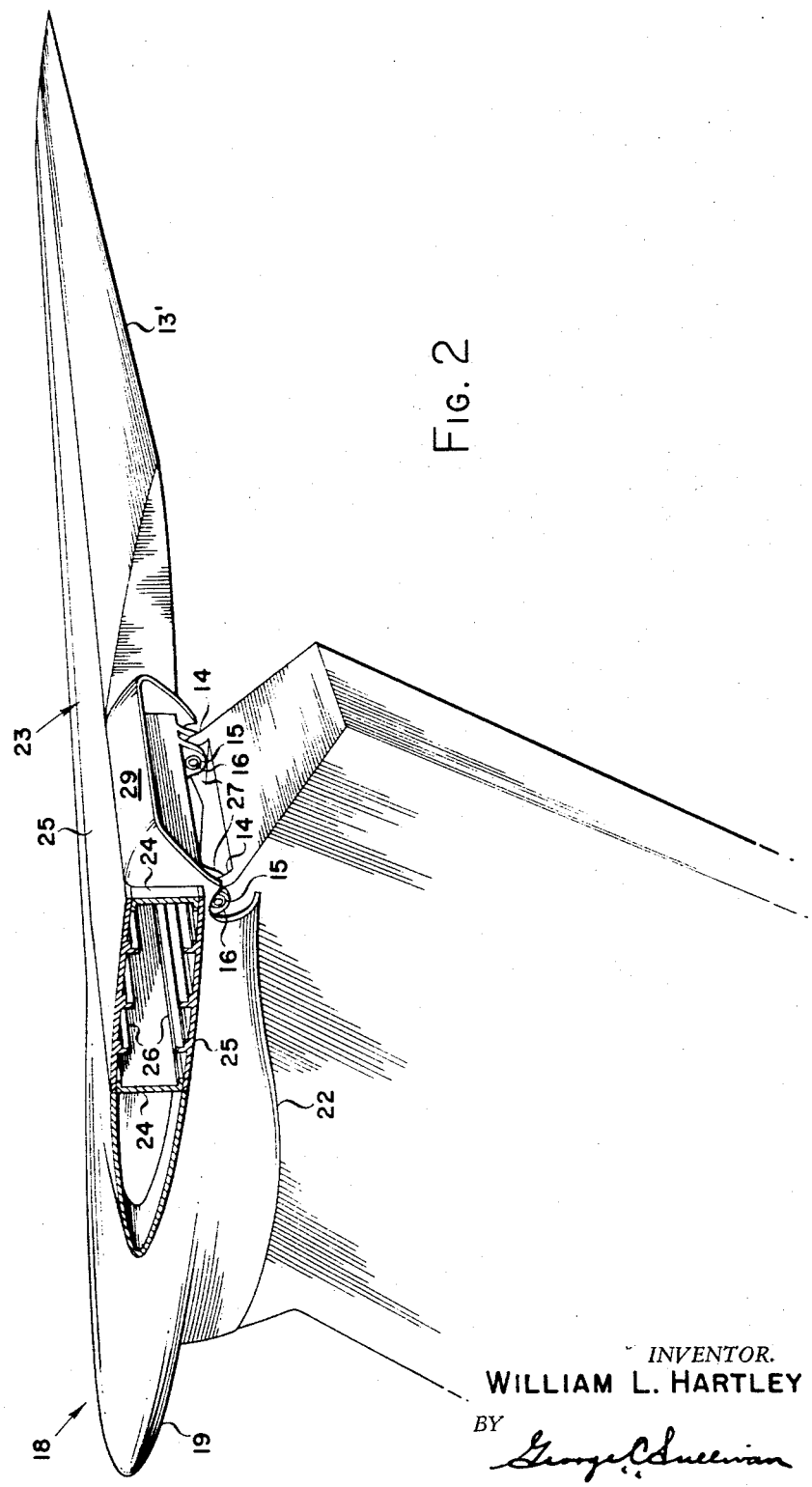
Figure 3:
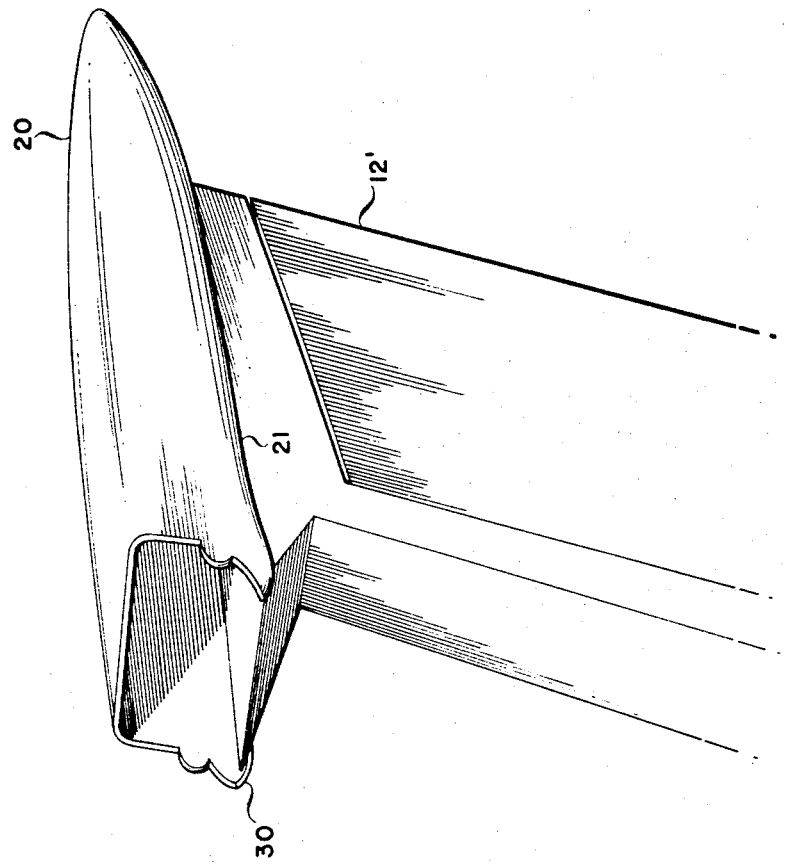
Figure 4:
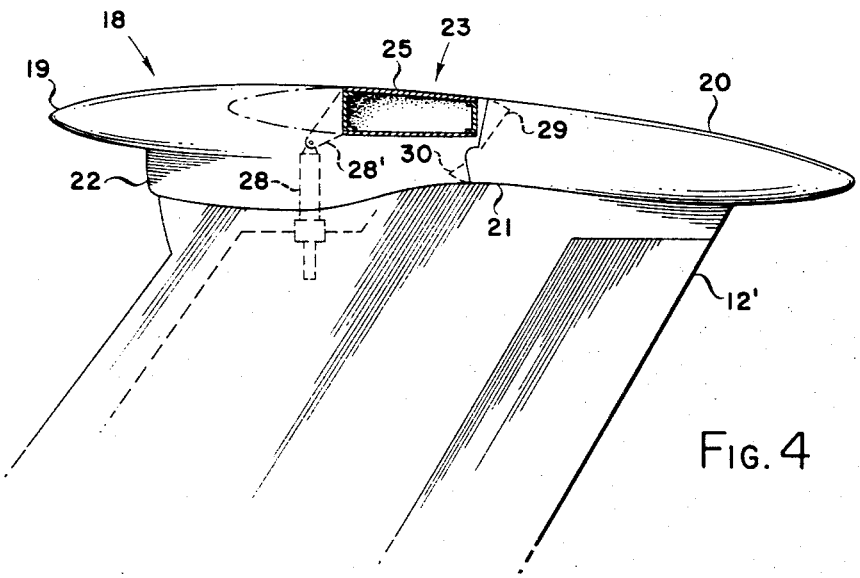
Figure 5:
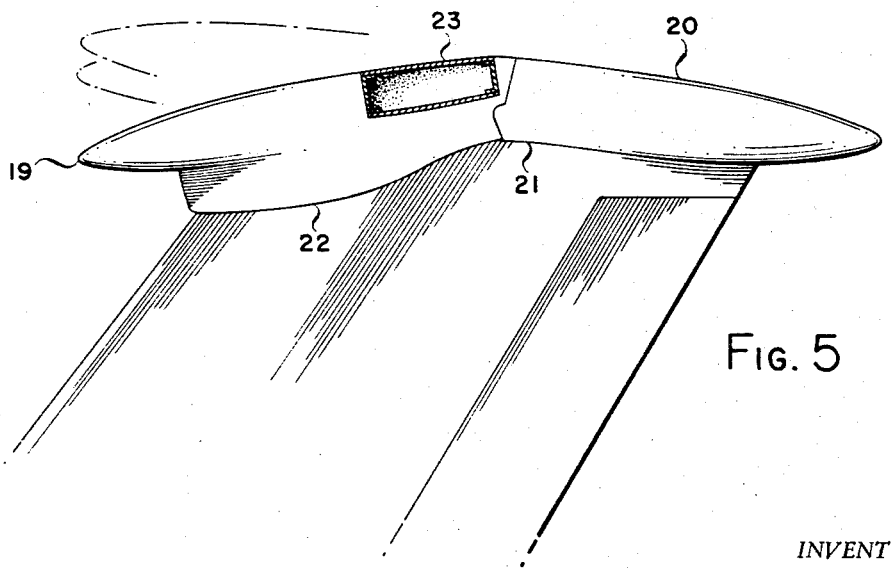

With the above and other objects in view, this invention consists in the construction, combination and arrangement of parts all as hereinafter more fully described, claimed and illustrated in the accompanying drawings wherein:

FIGURE 1 is a perspective view of the rear portion of an aircraft constructed in accordance with the teachings hereof to show, among other things, the hollow box beam extending from tip to tip of the horizontal stabilizer and the hinge line between the rotatable horizontal stabilizer including the forebody of the aerodynamic fairing and the stationary vertical stabilizer including the afterbody of the aerodynamic fairing;

FIGURE 2 is an isometric view from the rear of the empennage in the area of the junction of the vertical and horizontal stabilizers with the afterbody of the aerodynamic fairing removed and the horizontal stabilizer in section to show primarily the hollow box beam construction and hinge mounting thereof;

FIGURE 3 is an isometric view from the front of the empennage in the same area to show primarily the mounting of the afterbody on the vertical stabilizer as an immovable, integral part thereof, the horizontal stabilizer and forebody of the aerodynamic fairings and the forward portion of the vertical stabilizer including the hinge fitting for pivotally connecting the horizontal stabilizer and fairing forebody having been removed;

FIGURE 4 is a side view of the empennage in the same area with the horizontal stabilizer and attached forebody in the zero deflected position corresponding to the normal cruise regime of the aircraft; and FIGURE 5 is a similar view with the horizontal stabilizer and attached forebody in the extreme deflected positions corresponding to other flight regimes of the aircraft, such as landing, aerial delivery, etc., the zero and extreme up positions being shown in phantom lines.

Referring more particularly to the drawings, 10 designates the aft end portion of an aircraft fuselage to which an upswung tail section or empennage 11 is secured in appropriate manner following conventional practice. The empennage 11 is formed by a vertical control surface or stabilizer 12 at the upper or outer end of which is mounted a horizontal control surface or stabilizer 13 to form a T tail section or assembly.

The vertical stabilizer 12 is a hollow beam structure consisting of integrally stiffened skin planks, front and rear beams, built-up truss ribs oriented perpendicularly to the beams. Such detail has not been incorporated into the drawings, notably FIGURES 2 and 3, since such construction in general follows customary aircraft design. In order not to detract from the essence of the present invention, the vertical stabilizer 12 has been illustrated as though it were a solid member with the forward portion shown in FIGURE 2 adapted to mate with the aft portion shown in FIGURE 3 to which it would be immovably secured.

Medially of its fore and aft dimension at the top, the vertical stabilizer 12 is formed or otherwise provided with a pair of laterally aligned, spaced lugs 14 appropriately provided with internal pivot bearings 15 to accommodate pivot pins 16. At and along its aft end, the vertical stabilizer 12 mounts a rudder assembly 12' hinged in the conventional manner, while the horizontal stabilizer 13 similarly mounts elevator assemblies 13'.

The horizontal stabilizer 13 is connected to the vertical stabilizer 12 by means of and through an aerodynamic fairing or bullet 18. The bullet 18 is formed in two hollow halves, viz., a forebody 19 and afterbody 20 adapted to coact at all times in end-to-end, telescopic association. The afterbody 20 carries a depending skirt 21 conforming in shape and area to the aft upper end of the vertical stabilizer 12 which it encloses and to which it is secured in any conventional manner so as to form in effect an integral continuation or extension thereof. The length of the skirt 21 and the end of the vertical stabilizer 12 overlapped thereby is such as to provide a miximum area of surface-to-surface contact. A generally similar skirt 22 is provided on the forebody 19 for similar coaction with the upper forward portion of the vertical stabilizer 12. However, unlike skirt 21, skirt 22 is unconnected from the associated portion of the stabilizer 12 for reasons to become more apparent.

The forebody 19 is formed by a central hollow box beam 23 which extends transversely thereacross, being an integral and uninterrupted continuation of a box beam that extends the full length of the horizontal stabilizer 13.

Preferably, this box beam 23 is formed by a pair of C channels 24 defining the sides thereof and interconnected by a milled skin plank 25 across their corresponding sides constituting the beam top and bottom. The rigidity of each such skin plank 25 is enhanced by integral ribs 26 thereon. At its aft end, in box beam 23 carries a pair of clevis fittings 27 on its under side for coaction with the lugs 14 by which the entire horizontal stabilizer 13 and forebody 19 are pivotally hinged as a unit for predetermined rotation in the vertical plane corresponding to the complete pitch trim angle range of the aircraft. Such vertical movement may be accomplished by means of a power actuator 28 appropriately mounted between fixed structure of the vertical stabilizer 12 and fixed structure within the forebody 19, for example through a fixed arm or horn 28' on the forward end of the beam 23.

At its aft end, the forebody 19 is provided on its upper portion with a scoop-like extension 29 having an outer surface that is circular about the pivot 16 and which is adapted to insert within the forward opening of the afterbody 20. A generally similar arrangement including extension 30 is provided on the forward, lower portion of the afterbody 20. The aft end of the forebody 19 is thereby allowed to pass freely into the forward end of afterbody 20 at the top while the forward end of the afterbody 20 passes freely into the aft end of forebody 19 when the horizontal stabilizer 13 is rotated by operation of the actuator 28. During such movement, it is possible to maintain a uniform space between the adjacent surfaces of the forebody 19 and afterbody 20 at all times. This permits or facilitates seal means if desirable between these two elements that comprise the aerodynamic fairing 18.

In view of the foregoing construction and arrangement, it is apparent that the overall size of the horizontal stabilizer 13 is held to a minimum of mounting structure by fabricating it as an integral part in effect of the forebody 19. At the same time, this allows minimizing its weight through the use of the hollow box beam 23 in lieu of the conventional fore and aft spars which would otherwise be required to give the horizontal stabilizer 13 the necessary structural integrity. Moreover, structural integrity is assured with the present construction through the substantially enlarged supporting structure offered by the integral connection of the afterbody 20 to the vertical stabilizer 12. This afterbody connection constitutes in effect a relatively deep torque box beam to substantially enhance the supporting qualities of the vertical stabilizer 12 to which the movable portion or forebody 19 of the horizontal stabilizer 13 is mounted on the pivot pin connection at 16.

What is claimed is:

1. A T-tail construction for aircraft wherein the horizontal stabilizer is located adjacent the outer end of the vertical stabilizer comprising:

an aerodynamic fairing enclosing the junction of said horizontal and vertical stabilizers, said fairing being formed by a forebody and an afterbody in end-to-end telescopic association one with the other, said forebody being secured to said horizontal stabilizer and said afterbody being secured to said vertical stabilizer;

a pivotal connection between the associated telescopic ends of said forebody and said afterbody; and an actuator connected between said vertical stabilizer and said forebody and operative to rotate the latter relative to the former about said pivotal connection.

2. The T-tail construction of claim 1 including a continuous hollow beam extending the full length of said horizontal stabilizer, passing without interruption through said forebody.

3. The T-tail construction of claim 2 wherein said pivotal connection includes an element carried by said beam adapted to coact with a complemental element carried by said vertical stabilizer.

4. The T-tail construction of claim 2 wherein said beam includes a fixed horn adapted to connect one end of said actuator.

5. The T-tail construction of claim 1 wherein said horizontal and vertical stabilizers have substantially equal dimensions at said junction and said forebody includes an extending skirt adapted to overlie and enclose the adjacent portion of said vertical stabilizer at all times during its rotation as aforesaid.

6. The T-tail construction of claim 2 wherein said beam is formed by a pair of spaced, parallelly disposed C channels interconnected one to the other at and along corresponding sides by respective milled skin planks.

7. The T-tail of claim 1 including a skirt depending from said forebody adapted to overlie and enclose the adjacent end of said vertical stabilizer.

8. The T-tail construction of claim 7 including a scoop-like extension on the upper aft end of said forebody having an external surface that is circular about said pivotal connection, overlying the intersection of the vertical and horizontal stabilizers and adapted for insertion into the forward end of said afterbody, and an extension on the lower forward end of said afterbody adapted to insert into and overlap said skirt.

References Cited

UNITED STATES PATENTS 3,109,614   11/1963   Steiol _____ 244—87

MILTON BUCHLER, *Primary Examiner.*

R. A. DORNON, *Assistant Examiner.*

U.S. Cl. X.R.

244—124